United States Patent [19]
Kalinowski et al.

[11] Patent Number: 5,880,195
[45] Date of Patent: Mar. 9, 1999

[54] ADDITION CURABLE COMPOSITIONS CURABLE TO HIGH TENSILE STRENGTH, TACK FREE COMPOSITIONS THROUGH APPROPRIATE FILLER SELECTION

[75] Inventors: Robert Edward Kalinowski, Auburn; Mary Kay Tomalia, Midland, both of Mich.; Andreas Thomas Franz Wolf, Braine-L'Alleud, Belgium

[73] Assignee: Dow Corning GmbH & Dow Corning Corporation, Midland, Mich.

[21] Appl. No.: 984,585

[22] Filed: Dec. 3, 1997

Related U.S. Application Data

[63] Continuation-in-part of Ser. No. 772,539, Dec. 24, 1996, abandoned.

[51] Int. Cl.[6] ........................................... C08K 3/26
[52] U.S. Cl. ..................... 524/426; 524/427; 524/425; 524/493; 524/588; 524/506
[58] Field of Search ..................... 524/426, 427, 524/425, 493, 588, 506

[56] References Cited

U.S. PATENT DOCUMENTS 5,409,995  4/1995  Iwahara et al. ..................... 525/100

FOREIGN PATENT DOCUMENTS

| 0 709 403 | 5/1996 | European Pat. Off. . |
| 0709403 | 5/1996 | European Pat. Off. . |
| 20755644 | 3/1990 | Japan . |

OTHER PUBLICATIONS

Macosko, C.W. and Saam, J.C., "The Hydrosilylation Cure of Polyisobutene", pp. 48–49.

*Primary Examiner*—Margaret W. Glass
*Attorney, Agent, or Firm*—Patricia M. Scaduto

[57] ABSTRACT

This invention relates to the preparation of an addition curable composition curable to a high tensile strength, tack free composition. The addition curable composition comprises an organic polymer having on average at least 1.4 alkenyl groups per molecule, a crosslinker having on average at least 1.4 hydrosilyl groups per molecule, a platinum group metal-containing catalyst and a specific ratio of a fatty acid treated, precipitated calcium carbonate filler having an average particle size in the range of 0.05 to 1 micron and a ground filler selected from the group consisting of calcium carbonate, kaolin clay and amorphous, non quartz silica each having an average particle size in the range of 0.2 to 40 microns.

31 Claims, No Drawings

ADDITION CURABLE COMPOSITIONS CURABLE TO HIGH TENSILE STRENGTH, TACK FREE COMPOSITIONS THROUGH APPROPRIATE FILLER SELECTION

This application is a continuation-in-part of application Ser. No. 08/772,539 filed Dec. 24, 1996 which application is now abandoned.

BACKGROUND OF THE INVENTION

This invention relates to an addition curable composition containing alkenyl functional organic polymers and hydrosilyl functional crosslinkers having improved properties through appropriate filler selection.

BACKGROUND INFORMATION

Saam and Macosko, Polym. Prepr., 26 (2) 48–9 (1985) describe a platinum catalyzed addition reaction between a terminally unsaturated polyisobutylene (PIB) polymer and bifunctional $HMe_2SiOMe_2SiOSiMe_2H$ such that a copolymer forms or a tetrafunctional $Si(OSiMe_2H)_4$ which crosslinks the PIB polymer into an elastomer, in each case where Me is a methyl group.

Japanese Patent Application Kokai No. 2-75644 describes a curable resin composition comprising (A) a saturated hydrocarbon polymer containing at least one alkenyl group per molecule, (B) a polyorganohydrogen siloxane containing at least two hydrogen atoms bonded to silicon atoms per molecule, and (C) a platinum catalyst.

U.S. Pat. No. 5,409,995 describes a curable composition comprising (C) an organic curing agent having at least two hydrosilyl groups per molecule, prepared as described therein, (D) an organic polymer having at least one alkenyl group per molecule, and (E) a hydrosilyation catalyst.

EP0709403A1, published May 1, 1996, describes a curable composition for injection molding comprising (A) a saturated hydrocarbon polymer containing at least one alkenyl group capable of undergoing a hydrosilylation reaction per molecule, (B) a hardener having a molecular weight of 30,000 or lower and containing at least two hydrosilyl groups per molecule, (C) a hydrosilylation catalyst, and optionally, (D) at least one inorganic filler selected from a fine silica powder, calcium carbonate, talc and carbon black.

Silicone compounds are known for their weather resistance, water resistance and thermal stability, however they tend to be more expensive than their organic counterparts which don't have as good a property profile. Silicon modified organic materials may provide another option. For example, addition curable compositions which utilize a hydrosilyl functional or Si—H containing compound to crosslink an alkenyl functional organic polymer are useful when cured as sealants, adhesives, coatings, molding and potting compounds, gels and additives.

To improve the physical properties of the cured addition curable composition, such as tensile strength, maximum elongation and modulus, reinforcing fillers, such as treated precipitated calcium carbonate, silica, carbon black etc., may be added to the composition. Although certain properties are enhanced by the addition of reinforcing fillers, other properties such as surface tack and tack free time are typically either not affected or may be affected negatively.

To reduce the cost of the addition curable composition, extending fillers, such as ground calcium carbonate, kaolin clays etc., may also be added to the composition. These extending fillers reduce the cost, however, the physical properties of the cured composition are typically not improved.

The addition of either the reinforcing or extending fillers also tend to reduce the extrusion rate of the composition.

The inventors have unexpectedly determined that by adding certain fillers in specific combinations an addition curable composition having an improved property profile can be obtained.

Specifically, the inventors have determined that the addition of a fatty acid treated precipitated calcium carbonate filler and a ground filler in specific ratios to an addition curable composition provides a cured composition with improved overall properties, such as increased maximum elongation, tensile strength and a tack free surface and also enhances the extrusion rate of curable composition.

The objective of this invention is to prepare an addition curable composition curable to a high tensile strength, tack free composition.

SUMMARY OF THE INVENTION

The objective of this invention can be achieved by preparing an addition curable composition using specific fillers in specific ratios. The addition curable composition comprises an organic polymer having on average at least 1.4 alkenyl groups per molecule, a crosslinker having on average at least 1.4 hydrosilyl groups per molecule, a platinum group metal-containing catalyst and a specific ratio of a fatty acid treated, precipitated calcium carbonate filler having an average particle size in the range of 0.05 to 1 micron and a ground filler selected from the group consisting of calcium carbonate, kaolin clay and amorphous, non quartz silica having an average particle size in the range of 0.2 to 40 microns.

DETAILED DESCRIPTION OF THE INVENTION

This invention relates to an addition curable composition comprising a product formed from components comprising:

(A) 100 parts by weight of an organic polymer having on average at least 1.4 alkenyl groups per molecule;

(B) an amount sufficient to cure the composition of a crosslinker having on average at least 1.4 hydrosilyl groups per molecule;

(C) a platinum group metal-containing catalyst in an amount sufficient to effect curing of the composition;

(D) 25 to 250 parts by weight of a fatty acid treated, precipitated calcium carbonate filler having an average particle size in the range of 0.05 to 1 micron; and (E) 25 to 125 parts by weight of a ground filler selected from the group consisting of calcium carbonate, kaolin clay and amorphous, non quartz silica each having an average particle size in the range of 0.2 to 40 microns;

provided, that the ratio of fatty acid treated precipitated calcium carbonate filler to ground filler is from 10:1 to 1:5.

Component (A) is an organic polymer having on average at least 1.4 alkenyl groups per molecule. The organic polymer may be linear or branched and may be a homopolymer, copolymer or terpolymer. The organic polymer may also be present as a mixture of different organic polymers so long as there is on average at least 1.4 alkenyl groups per polymer molecule. Specific examples of the polymer chain include a polyether such as polyoxyethylene, polyoxypropylene, polyoxytetramethylene, polyoxyethylene-polyoxypropylene; a polyester prepared by a condensation of a dibasic acid such as adipic acid and a glycol or by a ring-opening polymerization of lactones; ethylene-propylene copolymer; a polybutylene such as polyisobutylene; a copolymer of isobutylene with isoprene or the like; polychloroprene; polyisoprene; a copolymer of isoprene with butadiene, acrylonitrile, styrene or the like; polybutadiene; a copolymer of butadiene with styrene, acrylonitrile or the like; and a polyolefin prepared by hydrogenating polyisoprene, polybutadiene, or a copolymer of isoprene or butadiene with acrylonitrile, styrene or the like.

The preferred organic polymer comprises a homopolymer or a copolymer selected from the group consisting of a polyether, a polyester, a polybutylene where the polybutylene chain may comprise repeat units having the following formulas

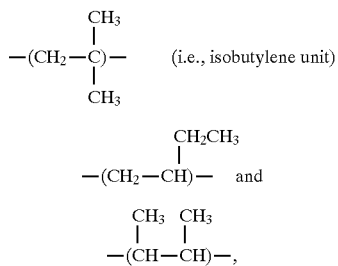   (i.e., isobutylene unit)

as well as rearranged products such as

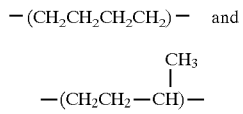

a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

It is more preferred that the organic polymer comprises a homopolymer or copolymer wherein at least 50 mole percent of the repeat units are isobutylene units of the following structure:

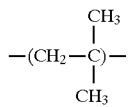

One or more hydrocarbon monomers, such as isomers of butylene, styrene, derivatives of styrene, isoprene and butadiene may be copolymerized with the isobutylene, the preferred co-monomer being selected from 1-butene, α-methylstyrene and isoprene. It is even more preferred that the organic polymer comprise at least 80 mole percent of the isobutylene repeat units described above. Most preferably, the organic polymer, other than the alkenyl groups, is a homopolymer consisting essentially of isobutylene repeat units.

The alkenyl groups of the organic polymer are not limited and include for example, vinyl, allyl, 1-hexenyl and decadecenyl, preferably allyl. In preferred embodiments, a group X may bond the alkenyl group to the main chain of the organic polymer, as described by formula:

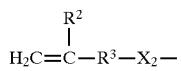

wherein $R^2$ is a hydrogen atom or a methyl radical, $R^3$ is a divalent hydrocarbon radical having between 1 and 18 carbon atoms, and z is 0 or 1. The group X bonds with $R^3$ of the alkenyl group through a group other than carbon, forming an ether, ester, carbonate, amide, urethane or siloxane linkage, preferably an ether linkage, to the main chain of the organic polymer.

The alkenyl groups may be found pendant along the polymer chain or at the chain ends, with it being preferable for the alkenyl groups to be at the chain ends. It is most preferred that the majority of the organic polymer molecules have an alkenyl group at each chain end.

While there must be on average at least 1.4 alkenyl groups per organic polymer molecule, it is preferred that each polymer molecule have on average 1.8 to 8 alkenyl groups with 1.8 to 4 alkenyl groups on average per molecule being more preferred.

The alkenyl group may be introduced into the organic polymer by known methods. Typically, the alkenyl groups may be introduced after polymerization or during polymerization.

The method for introducing the alkenyl group after the polymerization includes, for example, reacting an organic polymer having a functional group such as a hydroxyl group or an alkoxide group at the chain end, in the main chain or in a side chain, with an organic compound having an alkenyl group and an active group which is reactive to said functional group so as to introduce the alkenyl group into the polymer molecule. Specific examples of the organic compound having the alkenyl group and the active group which is reactive to said functional group are a $C_3$–$C_{20}$ unsaturated aliphatic acid, acid halide and acid anhydride such as acrylic acid, methacrylic acid, vinyl acetate, acrylic chloride and acrylic bromide; a $C_3$–$C_{20}$ unsaturated aliphatic acid substituted halide such as allyl chloroformate ($CH_2CHCH_2OCOCl$) and allyl bromoformate ($CH_2CHCH_2OCOBr$); allyl chloride, allyl bromide, vinyl (chloromethyl)benzene, allyl(chloromethyl)benzene, allyl (bromomethyl)benzene, allyl chloromethyl ether, allyl (chloromethoxy)benzene, 1-butenyl chloromethyl ether, 1-hexenyl(chloromethoxy)benzene, allyloxy(chloromethyl) benzene and isocyanate functional $C_3$–$C_{20}$ unsaturated aliphatic organic compounds or isocyanate functional silanes having alkenyl groups, such as $Vi(CH_3)_2Si(CH_2)_3NCO$ where Vi is vinyl.

The method for introducing the alkenyl group during the polymerization includes, for example, introducing the alkenyl group in the main chain or at the chain end of the polymer by using a vinyl monomer which has an alkenyl group having a low radical reactivity in the molecule such as allyl methacrylate and allyl acrylate or a radical chain transfer agent which has an alkenyl group having a low radical reactivity such as allyl mercaptan when the organic polymer is prepared by a radical polymerization.

The bonding manner of the alkenyl group to the main chain of the organic polymer is not limited. The alkenyl group may directly bond to the main chain of the organic polymer by a carbon-carbon linkage, or it may bond to the main chain of the organic polymer through an ether, ester, carbonate, amide, urethane or siloxane linkage.

The butylene polymers useful herein may be prepared by methods known in the art, such as described in Kennedy, et al. U.S. Pat. No. 4,758,631 which is hereby incorporated by reference. One telechelic butylene polymer, for example, is available from Kaneka Company (Japan) under the tradename EPION™

The number average molecular weight of the organic polymer may be from 500 to 300,000, preferably from 5000 to 20,000 and most preferably from 8000 to 15,000.

The present composition requires the presence of an amount sufficient to cure the composition of a crosslinker having on average at least 1.4 hydrosilyl or Si—H groups per molecule (Component (B)). Although the crosslinker must contain on average at least 1.4 hydrosilyl groups per molecule and no more than one silicon-bonded hydrogen atom per silicon atom, there is no other restriction on the crosslinker. For example, the crosslinker may be an organic molecule containing the required hydrosilyl groups as described in Iwahara, et al, U.S. Pat. No. 5,409,995 which is hereby incorporated by reference. Preferably, the crosslinker is an organohydrogensilane or organohydrogensiloxane where the remaining valences of the silicon-bonded hydrogen atoms are satisfied, for example, by oxygen atoms or monovalent hydrocarbon radicals comprising one to seven carbon atoms.

The monovalent hydrocarbons radicals can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all of the monovalent hydrocarbon radicals are methyl.

Organohydrogensiloxanes are more preferred as the crosslinker and examples of organohydrogensiloxanes useful as crosslinkers in the present composition are described, for example, in Lee et al., U.S. Pat. No. 3,989,668; Jensen, U.S. Pat. No. 4,753,978 and Iwahara, et al, U.S. Pat. No. 5,409,995, each of which are incorporated herein by reference. The organohydrogensiloxane crosslinker can be a homopolymer, a copolymer or mixtures thereof, containing for example, diorganosiloxy units, organohydrogensiloxy units, triorganosiloxy units and $SiO_2$ units. The organohydrogensiloxane crosslinker can be linear, cyclic and branched polymers and copolymers. It is preferred that the crosslinker be a linear organohydrogensiloxane or a mixture of a cyclic organohydrogensiloxane and a linear organohydrogensiloxane.

The more preferred crosslinkers are selected from methylhydrogen siloxane cyclics $[MeHSiO]_s$ where s is from 4 to 10 and methylhydrogen siloxane linears $(Me)_3SiO((Me)(H)SiO)_m((Me)_2SiO)_nSi(Me)_3$ where m is from 3 to 10, and n is from 1 to 5, in each case where Me is methyl. The most preferred crosslinker is the methylhydrogen siloxane linear $(Me)_3SiO((Me)(H)SiO)_m((Me)_2SiO)_nSi(Me)_3$ where m is 5, n is 3 and Me is methyl.

The amount of crosslinker useful in the present composition is that sufficient to cure the composition. Generally, a useful amount of crosslinker is that amount sufficient to provide a molar ratio of hydrosilyl groups to alkenyl groups of the organic polymer within a range of 0.65:10 to 10:1. Preferred is where the molar ratio of hydrosilyl groups of the crosslinker to alkenyl groups of the organic polymer is within a range of about 1:1 to 5:1. More preferred is where the molar ratio of hydrosilyl groups of the crosslinker to alkenyl groups of the organic polymer is within a range of about 1:1 to 2.2:1.

The crosslinker may be added as a single species or as a mixture of two or more different species.

A platinum group metal-containing catalyst (Component (C)) is used in the curable composition in an amount sufficient to promote curing of the composition. The platinum group metal-containing catalyst can be any such catalyst which is known to catalyze hydrosilation reactions. By "platinum group metal" it is meant ruthenium, rhodium, palladium, osmium, iridium, and platinum. A group of platinum group metal-containing catalysts particularly useful in the present composition are the platinum complexes prepared as described by Willing, U.S. Pat. No. 3,419,593, and Brown et al, U.S. Pat. No. 5,175,325, each of which is hereby incorporated by reference to show such complexes and their preparation. Preferred catalysts are solutions containing complexes of platinum with vinylsiloxane. Other examples of useful platinum group metal-containing catalyst can be found in Lee et al., U.S. Pat. No. 3,989,668; Chang et al., U.S. Pat. No. 5,036,117; Ashby, U.S. Pat. No. 3,159,601; Lamoreaus, U.S. Pat. No 3,220,972; Chalk et al., U.S. Pat. No. 3,296,291; Modic, U.S. Pat. No. 3,516,946; Karstedt, U.S. Pat. No. 3,814,730; and Chandra et al, U.S. Pat. No. 3,928,629 all of which are hereby incorporated by reference to show useful platinum group metal-containing catalyst and methods for their preparation.

The amount of platinum group metal-containing catalyst useful in effecting curing of the present composition is not narrowly limited as long as there is a sufficient amount present to accelerate a reaction between the hydrosilyl groups and the alkenyl groups. The appropriate amount of the platinum group metal-containing catalyst will depend upon the particular catalyst used. In general as low as about 0.1 parts by weight of platinum group metal based on 1 million parts by weight of organic polymer may be useful (ie. 0.1 ppm). Preferably the amount of platinum group metal is at least 5 ppm. More preferred is from about 10 ppm to about 200 ppm of platinum group metal.

The platinum group metal-containing catalyst may be added as a single species or as a mixture of two or more different species. Adding the catalyst as a single species is preferred.

To reduce the cost of the addition curable composition, extending fillers, such as ground calcium carbonate, kaolin clays etc., may be added to the composition. These extending fillers reduce the cost, however, the physical properties of the cured composition are typically not improved.

To improve the physical properties, such as tensile strength, maximum elongation and modulus, of the cured addition curable composition, reinforcing fillers, such as treated precipitated calcium carbonate, silica, carbon black etc., may be added to the composition. Although certain properties are enhanced by the addition of reinforcing fillers, other properties such as surface tack and tack free time are typically either not affected or may be affected negatively.

The inventors have unexpectedly determined that by adding specific fillers in specific combinations an addition curable composition curable to a high tensile strength, tack free composition can be obtained.

Component (D) is a fatty acid treated precipitated calcium carbonate filler having an average particle size in the range of 0.05 to 1 micron, preferably from 0.07 to 0.1 microns. As used herein, the term "fatty acid treated" means the filler particles are contacted with a mixture of saturated or unsaturated aliphatic fatty acids ($C_{12}$–$C_{20}$) so that at least a partial reaction of the fatty acids with the filler particle surface occurs.

This fatty acid treated precipitated calcium carbonate filler contributes positively to the improvement in physical properties of the cured composition, particularly tensile strength and maximum elongation, however, tack free time is not improved and extrusion rate is decreased. These fatty acid treated precipitated calcium carbonate fillers are commercially available, such as Winnofil SPM manufactured by ICI, Socal 312N manufactured by Solvay and Ultra-pflex manufactured by Pfizer. Winnofil SPM is preferred because its use results in the highest maximum elongation.

The fatty acid treated precipitated calcium carbonate filler may be added in amounts from 25 to 250 parts by weight based on 100 parts by weight of the organic polymer. It is preferred to use from 50 to 125 parts with 75 to 125 parts being more preferred. One type of fatty acid treated precipitated calcium carbonate filler may be added to the composition or a mixture of two or more types of the fatty acid treated precipitated calcium carbonate fillers may be added.

The inventors have determined that an improved overall property profile may be obtained through the addition of a ground filler selected from the group consisting of calcium carbonate, kaolin clay and amorphous, non quartz silica each having an average particle size in the range of 0.2 to 40 microns (Component (E)) with the fatty acid treated precipitated calcium carbonate filler.

The preferred average particle size of the ground filler should be in the range of 0.2 to 25 microns, with 0.2 to 15 microns being more preferred.

The ground filler may be treated or untreated. As used herein, the term "treated" means the filler particles are contacted with one or more treating agents so that at least a partial reaction of the treating agent with the filler particle surface occurs. Examples of treating agents used to treat the ground filler include fatty acids, fatty acid esters, resin acids, titanates, vinylsilanes and hexamethyldisilazane. Treated ground fillers are preferred.

Commercially available examples of untreated ground calcium carbonate filler include Atomite, manufactured by ECC America and Omycarb UFT and FT manufactured by Omya.

Commercially available examples of untreated ground calcium carbonate filler include CS-11 manufactured by Georgia Marble.

Commercially available examples of untreated ground kaolin clay filler include Burgess KE and Burgess iceberg, both manufactured by Burgess and Bilt Plates 156 manufactured by Vanderbilt.

Commercially available examples of untreated ground amorphous non quartz silica filler include Pumasil 25/8 and Pumasil 5/2, both available from General Chemicals and Plastics Services Company.

Ground calcium carbonate is the preferred ground filler. It is most preferred that the ground filler be a fatty acid treated calcium carbonate filler, with the term "fatty acid treated" as defined earlier.

The ground filler may be added in amounts from 25 to 125 parts by weight based on 100 parts by weight of the organic polymer. It is preferred to use from 25 to 100 parts with 40 to 75 parts being more preferred. One type of ground filler may be added to the composition or a mixture of two or more types of the ground fillers may be added.

The fatty acid treated precipitated calcium carbonate filler and the ground filler provide improved overall properties when added in certain ratios. These ratios will vary depending on the specific properties desired, the fillers, the SiH/Alkenyl ratio and the type of crosslinkers and can be determined experimentally. Generally, a ratio of fatty acid treated precipitated calcium carbonate to ground filler of 10:1 to 1:5 provides benefit. It is preferred to add the fatty acid treated precipitated calcium carbonate to ground filler in a ratio of 5:1 to 1:1, with 3:1 to 1:1 being most preferred.

The present composition may cure rapidly at room temperature. To hinder this curing process an inhibitor may be added to the composition. The inhibitor can be any of those materials known to inhibit the catalytic activity of platinum group metal-containing catalysts. By the term "inhibitor" it is meant a material that retards the room temperature curing of the composition when incorporated in the composition at less than about 10 weight percent of the composition, without preventing the elevated temperature curing of the composition.

Inhibitors for platinum group metal-containing catalysts are well known in the art. A preferred class of inhibitors useful in the present composition are acetylenic alcohols as described in Kookootsedes et al., U.S. Pat. No. 3,445,420, which is incorporated herein by reference. Such acetylenic alcohols are exemplified by ethynylcyclohexanol and methylbutynol. Other examples of classes of inhibitors which may be useful in the present composition are described in Chung et al., U.S. Pat. No. 5,036,117, which is incorporated herein by reference.

The amount of inhibitor useful in the present composition is not known to be critical and can be any amount that will retard the reaction of the hydrosilyl groups with the alkenyl groups, while not preventing the reaction at elevated temperatures. The specific amount of inhibitor to be used will depend upon the particular inhibitor used, the concentration and type of catalyst, and the nature and amounts of organic polymer and crosslinker. Generally, when an inhibitor is used it is preferred that at least one mole of inhibitor be present for each mole of platinum group metal in the composition and that the inhibitor not exceed one weight percent of the composition.

In addition to the above ingredients, the composition may include additives which impart or enhance certain properties of the cured composition or facilitate processing of the curable composition. Typical additives include, but are not limited to, molecular sieve dessicants, adhesion promoters, plasticizers, functional and non-functional diluents, pigments, dyes, and heat and/or ultraviolet light stabilizers. The effect of any such additives should be evaluated as to their result and impact on other properties of the composition.

The addition curable composition of this invention may be prepared by mixing all the ingredients together. When all of the ingredients are mixed together, the composition will begin to cure unless a cure inhibitor is present. If the composition is not to be used immediately after mixing, it should be prepared in at least two parts keeping the crosslinker separate from the catalyst until curing is desired. For example, one part may contain the organic polymer, crosslinker and fillers and the other part may contain the organic polymer and catalyst. In a preferred embodiment, if shelf stability is desired, a molecular sieve dessicant may be added to the part containing the crosslinker and fillers. As described in more detail in Kalinowski, Ser. No. "Filled Addition Curable Compositions Having Reduced Gassing And Increased Shelf Stability," which is incorporated herein by reference, the molecular sieve dessicant reduces gassing that may occur due to reaction of the Si—H crosslinker with moisture in the filler. This will result in a two package composition having increased shelf stability, in addition to the benefits provided by this invention.

The following examples are presented for illustrative purposes and should not be construed as limiting the present invention which is delineated in the claims. Unless otherwise noted, casting and testing of the curable and cured materials were completed in the manner described below, under the conditions described.

Durometer (Shore A), ASTM D2240 using 6 mm thick samples, cured for 7 days at 23°±2° C., 55±5% relative humidity.

Tensile Strength, Modulus and Elongation, ASTMD412, using 1 mm thick samples, cured for 7 days at 23°±2 ° C., 55±5% relative humidity, Die C specimens.

Tack Free Time (TFT)—Measures the amount of time for sufficient surface cure that material does not transfer to other substrates. Material was spread 1.25 mm thick on a clean polyethylene surface at 23°±2° C., 55±5% relative humidity and a timer immediately started. Hands were thoroughly washed and dried. Periodically, the surface was lightly touched with the fingertip (pressing hard enough to leave an indentation if the skin over time was reached) and then slowly drawn away. Finger was cleaned immediately after touch and sequence repeated until no material adhered to the fingertip.

Surface tack—This test was done in a similar manner to tack free time using except the samples cured for 7 days at 23°±2° C., 55±5% relative humidity prior to testing. An assessment was made of the tackiness as follows: dry—sample didn't feel tacky at all; slight tack sample felt tacky but separated easily once finger was lifted; medium tack—sample felt tacky and sample lifted up to 15 mm before separating from finger, once finger was lifted; strong tack—felt very tacky and sample lifted up to 25 mm before separating from finger, once finger was lifted.

Extrusion Rate—is the weight, in grams per minute (g/min), of the uncured composition when extruded through a 3.2 mm orifice when the composition is under a pressure of 620 kPa.

EXAMPLE 1

(A) A masterbatch of base material was prepared using 500 g $CH_2=CH(CH_2)_6$ $CH(Cl)CH_2((CH_3)_2C-CH_2)_m$ $(CH_3)_2C$—phenyl—$C(CH_3)_2(CH_2(CH_3)_2C)_nCH_2CH(Cl)$ $(CH_2)_6CH=CH_2$, $M_n$=9,400, polydispersity Mw/Mn=1.2, with m and n being about equal and m+n being about 160, manufactured by Kaneka Corporation (decadiene PIB) and 500 g Panalane L-14E, a low molecular weight polybutene polymer having a viscosity of less than 320 cs, manufactured by Amoco Corporation (PB Polymer) were placed in a Ross mixer and mixed for approximately 15 min at 68 rpm.

(B) 50 g of the base material prepared in Example 1(A) was mixed with 0.55 g methylhydrogensiloxane cyclic tetramer (%H as SiH=1.487) manufactured by Petrarch in a Whip mixer for 30 sec at 425 rpm under a full vacuum (63 mm) giving an SiH:Alkenyl ratio of approximately 1.54:1. After scrapedown, 0.71 g of a platinum-containing complex which is the neutralized reaction product of chloroplatinic acid and sym-divinyltetramethyldisiloxane having a platinum concentration of 0.2% by weight (corresponding to 170 parts Pt based on 1 million parts decadiene PIB, ie ppm) was added and mixed for 30 sec at 425 rpm with a full vacuum. Samples were cast immediately onto a polyethylene film. Tensile strength, modulus and maximum elongation were tested and results are given in Table 1.

(C) 50 g of the base material prepared in Example 1(A) was mixed with 50 g of a surface treated, precipitated calcium carbonate, Winnofil SPM, available from ICI, (200 parts filler per 100 parts decadiene PIB) in a Whip mixer for two 30 sec mixing cycles, each with scrapedown under full vacuum (63 mm) at 425 rpm. After incorporation of the filler, 0.517 g methylhydrogensiloxane cyclic tetramer %H as SiH=1.487 (SiH:Alkenyl 1.45:1) from Petrarch was mixed in under full vacuum for 30 sec at 425 rpm. Following a scrape down, 0.71 g of a platinum-containing complex which is the neutralized reaction product of chloroplatinic acid and sym-divinyltetramethyldisiloxane having a platinum concentration of 0.2% by weight (170 ppm Pt) was mixed in for 30 sec at 425 rpm with a full vacuum. Samples were cast immediately onto a polyethylene film. Tensile stength, modulus and maximum elongation were tested and results are given in Table 1.

The results in Table 1 illustrate that the physical properties of the filled sample are much improved over the unfilled sample.

TABLE 1

| Example | Tensile Strength Mpa | Maximum Elongation % | 100% Modulus MPA |
|---|---|---|---|
| 1 (B) Unfilled | 0.14 | 304 | 0.06 |
| 1 (C) surface treated precipitated calcium carbonate filled | 0.9 | 1052 | 0.24 |

EXAMPLE 2

(A) 2000 g Epion Polymer, an allyl ended functional polyisobutylene polymer having a molecular weight of 10000 Mn and an alkenyl functionality of approximately 1.7, manufactured by Kaneka Corporation (Allyl PIB) and 2000 g Panalane L-14E, a low molecular weight polybutene polymer having a viscosity of less than 320 cs, manufactured by Amoco Corporation (PB polymer) were mixed for approximately 5 min at 68 rpm. After a scrapedown mixing was continued for a total of 15 min at 68 rpm forming a masterbatch of base material.

(B) 150 g of the base material prepared in Example 2(A) was mixed with 3.36 g $Me_3SiO(MeHSiO)_5(Me_2SiO)_3SiMe_3$, (%H as SiH=0.76) giving an SiH:Alkenyl ratio of 2:1 in a Ross mixer for 5 min at 68 rpm. After a scrape down of the mixing pot, 1.2 g of a solution of a platinum vinylsiloxane complex (giving 96 parts platinum based on 1 million parts Allyl PIB, ie. ppm) was added and mixed for 3–5 minutes at 68 rpm. Extrusion rate was determined, samples were cast on polyethylene sheeting and tack free time determined. Tensile stength, modulus and maximum elongation were tested and results are given in Table 2.

(C) Six samples were prepared by mixing 150 g of th e base material prepared in Example 2(A) with 112.5 g of a single filler selected from Winnofil SPM, Albacar 5970, Hakuenka CCR, Socal 312N, CS-11 and Atomite as described in Table 3, in a Ross mixer (150 parts filler per 100 parts Allyl PIB.)

The filler of choice was added to the base material and a spatula was used to slightly stir the filler into the base. This achieved a slight wet out of the filler with base material and improved the ease of incorporation of filler into the formulation. The filler was incorporated with 5–10 min mixing cycles with no vacuum at 68 rpm until a good dispersion was obtained, ie. no clearly visible filler particles present when a small amount of the mixture was thinly spread out on a sheet of polyethylene. Once the filler was dispersed, 1.92 g $Me_3 SiO(MeHSiO)_5(Me_2SiO)_3SiMe_3$, (%H as SiH=0.76) giving an SiH:Alkenyl ratio of 1.1:1 was added and mixed for 5 min at 68 rpm. After a scrape down of the mixing pot, 1.2 g of a solution of a platinum vinylsiloxane complex (96 ppm Pt) was added and mixed for 3-5 minutes at 68 rpm.

Extrusion rate was determined, samples were cast on polyethylene sheeting and tack free time determined. Tensile stength, modulus and maximum elongation were tested and results are given in Table 2.

TABLE 2

| Type of Filler | Amt of Filler pph | TFT min | Duro-meter | Tensile Strength MPa | Max. Elong. % | 200% Modulus MPa | Surface Tack | Extrusion Rate g/min |
|---|---|---|---|---|---|---|---|---|
| Unfilled | — | 32 | 15 | 0.15 | 128 | na | strong | 724 |
| Winnofil SPM[1] | 150 | <70 | 21 | 1.2 | 674 | 0.5 | slight | 29 |
| Albacar[2] | 150 | 39 | 29 | 1.08 | 330 | 0.68 | dry | nt* |
| Hak CCR[3] | 150 | <45 | 25 | 0.71 | 321 | 0.53 | dry | 199 |
| Socal 312N[4] | 150 | <60 | 18 | 0.9 | 558 | 0.42 | medium | 36 |
| CS-11[5] | 150 | 45 | 21 | 0.46 | 221 | 0.43 | dry | 327 |
| Atomite[6] | 150 | <45 | 25 | 0.62 | 212 | 0.58 | dry | nt* |

* not tested
[1] Winnofil SPM, a stearic acid treated precipitated calcium carbonate manufactured by ICI
[2] Albacar 5970, precipitated calcium carbonate manufactured by Spec Minerals
[3] Hakuenka CCR, an oleic acid treated precipitated calcium carbonate manufactured by Shirashi
[4] Socal 312N, a stearic acid treated precipitated calcium carbonate manufactured by Solvay
[5] Georgia Marble CS-11, a stearate treated ground calcium carbonate manufactured by Georgia Marble
[6] Atomite, a ground calcium carbonate manufactured by ECC America

EXAMPLE 3

Filled samples were prepared in the same manner as described in Example 2(C) above, except a lower filler loading was used. The fillers evaluated included precipitated calcium carbonate, ground calcium carbonate, kaolin clays and amorphous non quartz silica. As noted in the description of the fillers after the table some of these fillers also had surface treatment. In this example, 37.5 g of filler was added to 150 g of the base material prepared as described in Example 2(A) so that the samples contained 50 parts filler based on 100 parts Allyl PIB.

Extrusion rate was determined, samples were cast on polyethylene sheeting and tack free time determined. Tensile stength, modulus and maximum elongation were tested and results are given in Table 3.

TABLE 3

| Type of Filler | Amt of Filler pph | TFT min | Duro-meter | Tensile Strength MPa | Max. Elong. % | 200% Modulus MPa | Surface Tack | Extrusion Rate g/min |
|---|---|---|---|---|---|---|---|---|
| Unfilled | — | 32 | 15 | 0.15 | 128 | na | strong | 724 |
| Winnofil SPM[1] | 50 | 40 | 19 | 0.43 | 252 | 0.35 | slight | 315 |
| Albacar[2] | 50 | 95 | 17 | 0.33 | 187 | na | dry | nt* |
| CS-11[5] | 50 | <35 | 17 | 0.24 | 170 | na | dry | 569 |
| Burgess KE[6] | 50 | <120 | 20 | 0.6 | 234 | 0.5 | dry | 374 |
| Burgess Iceberg[7] | 50 | <720 | 23 | 0.73 | 225 | 0.65 | dry | 465 |
| Bilt Plates[8] | 50 | <120 | ** | ** | ** | ** | ** | ** |
| Pumasil 5/2[9] | 50 | <25 | 20 | 0.9 | 345 | 0.54 | dry | 113 |
| Pumasil 25/8[10] | 50 | 31 | 15 | 0.74 | 336 | 0.5 | dry | 179 |

* not tested
** Material was cured but too tacky to test
[1] Winnofil SPM, a stearic acid treated precipitated calcium carbonate manufactured by ICI
[2] Albacar 5970, precipitated calcium carbonate manufactured by Spec Minerals
[5] Georgia Marble CS-11, a stearate treated ground calcium carbonate manufactured by Georgia Marble
[6] Burgess KE, a vinylsilane treated kaolin clay manufactured by Burgess
[7] Burgess Iceberg, a calcined kaolin clay manufactured by Burgess
[8] Bilt-Plates 156, an airfloat kaolin clay manufactured by Vanderbilt
[9] Pumasil 5/2, an amorphous non quartz silica available from General Chemicals and Plastics Services Company
[10] Pumasil 25/8, an amorphous non quartz silica available from General Chemicals and Plastics Services Company

EXAMPLE 4

Various filled samples were prepared in the manner described in Example 2(C) using a fatty acid treated precipitated calcium carbonate (Winnofil SPM) and a fatty acid treated ground calcium carbonate (CS-11) except different filler loadings based on 100 parts by weight Allyl PIE were used as shown in Table 4. In addition, samples were prepared mixing the Winnofil SPM and CS-11 in specific combinations with the base material to give a total of 150 parts by weight of the mixed fillers to 100 parts by weight Allyl PIE. Samples were also prepared using a mixture of Albacar 5970, a precipitated calcium carbonate manufactured by Spec Minerals and Atomite, a ground calcium carbonate manufactured by ECC America.

Extrusion rate was determined, samples were cast on polyethylene sheeting and tack free time determined. Tensile stength, modulus and maximum elongation were tested and results are given in Table 4.

TABLE 4

| Type of Filler | Amt of Filler pph | TFT min | Duro-meter | Tensile Strength MPa | Max. Elong. % | 200% Modulus Mpa | Surface Tack | Extrusion Rate g/min |
|---|---|---|---|---|---|---|---|---|
| Unfilled | — | 32 | 15 | 0.15 | 128 | na | strong | 724 |
| Winnofil SPM[1] | 150 | <70 | 21 | 1.2 | 674 | 0.5 | slight | 29 |
| " | 100 | 50 | 24 | 0.83 | 408 | 0.46 | slight | 133 |
| " | 50 | 40 | 19 | 0.43 | 252 | 0.35 | slight | 315 |
| CS-11[5] | 150 | 45 | 21 | 0.46 | 221 | 0.43 | dry | 327 |
| " | 100 | <32 | 20 | 0.36 | 201 | 0.35 | dry | 501 |
| " | 50 | <35 | 17 | 0.24 | 170 | na | dry | 569 |
| SPM/CSX[x] | 125/25 | 40 | 24 | 1.05 | 526 | 0.53 | dry | 155 |
| " | 100/50 | 34 | 24 | 0.95 | 453 | 0.55 | dry | 142 |
| " | 75/75 | 32 | 25 | 0.95 | 447 | 0.55 | dry | 207 |
| " | 25/125 | <30 | 23 | 0.62 | 257 | 0.53 | dry | 278 |
| Albacar /Atomite[y] | 100/50 | 52 | 22 | 0.95 | 321 | 0.6 | dry | 145 |
| " | 75/75 | <60 | 25 | 0.91 | 294 | 0.63 | dry | 175 |

[1] Winnofil SPM, a stearic acid treated precipitated calcium carbonate manufactured by ICI
[5] Georgia Marble CS-11, a stearate treated ground calcium carbonate manufactured by Georgia Marble
[x] Combination of Winnofil SPM and Georgia Marble CS-11
[y] Combination of Albacar 5970, a precipitated calcium carbonate manufactured by Spec Minerals and Atomite, a ground calcium carbonate manufactured by ECC America

We claim:

1. An addition curable composition comprising a product formed from components comprising:
   (A) 100 parts by weight of an organic polymer having on average at least 1.4 alkenyl groups per molecule;
   (B) an amount sufficient to cure the composition of a crosslinker having on average at least 1.4 hydrosilyl groups per molecule;
   (C) a platinum group metal-containing catalyst in an amount sufficient to effect curing of the composition;
   (D) 25 to 250 parts by weight of a fatty acid treated, precipitated calcium carbonate filler having an average particle size in the range of 0.05 to 1 micron; and
   (E) 25 to 125 parts by weight of a ground filler selected from the group consisting of calcium carbonate, kaolin clay and amorphous, non quartz silica each having an average particle size in the range of 0.2 to 40 microns; provided, that the ratio of fatty acid treated precipitated calcium carbonate filler to ground filler is from 10:1 to 1:5.

2. The addition curable composition of claim 1, wherein the organic polymer has on average 1.8 to 8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

3. The addition curable composition of claim 2 wherein at least 50 mole percent of the repeat units of the organic polymer are isobutylene units.

4. The addition curable composition of claim 3, wherein the organic polymer has on average 1.8 to 4 alkenyl groups per molecule and at least 80 mole percent of the repeat units are isobutylene units.

5. The addition curable composition of claim 4, wherein the organic polymer, other than the alkenyl groups, is a homopolymer consisting essentially of isobutylene repeat units.

6. The addition curable composition of claim 2, wherein the amount of the crosslinker added to the composition provides a ratio of hydrosilyl groups to alkenyl groups of the organic polymer within a range of about 0.65:10 to 10:1.

7. The addition curable composition of claim 3, wherein the amount of the crosslinker added to the composition provides a ratio of hydrosilyl groups to alkenyl groups of the organic polymer within a range of about 1:1 to 5:1 and the crosslinker is an organohydrogensiloxane.

8. The addition curable composition of claim 5, wherein the amount of crosslinker added to the composition provides a ratio of hydrosilyl groups to alkenyl groups of the organic polymer within a range of about 1:1 to 2.2:1 and the crosslinker is selected from methylhydrogensiloxane cyclics [(Me)(H)SiO]$_s$ where s is from 4 to 10 and methylhydrogensiloxane linears (Me)$_3$SiO((Me)(H)SiO)$_m$((Me)$_2$SiO)$_n$Si(Me)$_3$ where m is from 3 to 10 and n is from 1 to 5, in each case where Me is methyl.

9. The addition curable composition of claim 7, wherein the platinum group metal containing catalyst comprises platinum and the amount added to the composition is at least 5 parts by weight of platinum based on 1 million parts of the organic polymer.

10. The addition curable composition of claim 8, wherein the platinum group metal containing catalyst is a solution of a platinum vinylsiloxane complex and the amount added to the composition is from about 10 parts to 200 parts by weight of platinum based on 1 million parts of the organic polymer and the crosslinker is $(Me)_3SiO((Me)(H)SiO)_m((Me)_2SiO)_nSi(Me)_3$ where m is 5 and n is 3 and Me is methyl.

11. The addition curable composition of claim 2 wherein the product comprises from 50 to 125 parts by weight of the fatty acid treated, precipitated calcium carbonate filler and from 25 to 100 parts by weight of a ground filler -selected from the group consisting of calcium carbonate, kaolin clay and amorphous, non quartz silica each having a particle size in the range of 0.2 to 25 microns.

12. The addition curable composition of claim 5 wherein the product comprises 50 to 125 parts by weight of the fatty acid treated, precipitated calcium carbonate filler and from 25 to 100 parts by weight of a ground filler selected from the group consisting of calcium carbonate, kaolin clay and amorphous, non quartz silica each having a particle size in the range of 0 .2 to 25 microns.

13. The addition curable composition of claim 8 wherein the product comprises from 50 to 125 parts by weight of a fatty acid treated, precipitated calcium carbonate filler having a particle size in the range of 0.07 to 0.1 microns and from 25 to 100 parts by weight of a ground calcium carbonate filler having a particle size in the range of 0.2 to 25 microns, provided, that the ratio of fatty acid treated precipitated calcium carbonate to ground calcium carbonate filler is from 5:1 to 1:1.

14. The addition curable composition of claim 10 wherein the product comprises from 75 to 125 parts by weight of a fatty acid treated, precipitated calcium carbonate filler having a particle size in the range of 0.07 to 0.1 microns and from 40 to 75 parts by weight of a fatty acid treated ground calcium carbonate filler having a particle size in the range of 0.2 to 15 microns, provided, that the ratio of fatty acid treated precipitated calcium carbonate to fatty acid treated ground calcium carbonate filler is from 3:1 to 1:1.

15. The addition curable composition of claim 1, and further comprising an inhibitor.

16. A method of preparing an addition curable composition comprising mixing:

(A) 100 parts by weight of an organic polymer having on average at least 1.4 alkenyl groups per molecule;

(B) an amount sufficient to cure the composition of a crosslinker having on average at least 1.4 hydrosilyl groups per molecule;

(C) a platinum group metal-containing catalyst in an amount sufficient to effect curing of the composition;

(D) 25 to 250 parts by weight of a fatty acid treated, precipitated calcium carbonate filler having an average particle size in the range of 0.05 to 1 micron; and (E) 25 to 125 parts by weight of a ground filler selected from the group consisting of calcium carbonate, kaolin clay and amorphous, non quartz silica each having an average particle size in the range of 0.2 to 40 microns; provided, that the ratio of fatty acid treated precipitated calcium carbonate filler to ground filler is from 10:1 to 1:5.

17. The method of claim 16, wherein the organic polymer has on average 1.8 to 8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

18. The method of claim 17, wherein the organic polymer has on average 1.8 to 4 alkenyl groups per molecule and at least 80 mole percent of the repeat units are isobutylene units.

19. The method of claim 18, wherein the organic polymer, other than the alkenyl groups, is a homopolymer consisting essentially of isobutylene repeat units.

20. The method of claim 17, wherein the amount of the crosslinker added to the composition provides a ratio of hydrosilyl groups to alkenyl groups of the organic polymer within a range of about 0.65:10 to 10:1.

21. The method of claim 18, wherein the amount of the crosslinker added to the composition provides a ratio of hydrosilyl groups to alkenyl groups of the organic polymer within a range of about 1:1 to 5:1 and the crosslinker is an organohydrogensiloxane.

22. The method of claim 19, wherein the amount of crosslinker added to the composition provides a ratio of hydrosilyl groups to alkenyl groups of the organic polymer within a range of about 1:1 to 2.2:1 and the crosslinker is selected from methylhydrogensiloxane cyclics $[(Me)(H)SiO]_s$ where s is from 4 to 10 and methylhydrogensiloxane linears $(Me)_3Sio((Me)(H)SiO)_m((Me)_2SiO)_nSi(Me)_3$ where m is from 3 to 10 and n is from 1 to 5, in each case where Me is methyl.

23. The method of claim 21, wherein the platinum group metal containing catalyst comprises platinum and the amount added to the composition is at least 5 parts by weight of platinum based on 1 million parts of the organic polymer.

24. The method of claim 22, wherein the platinum group metal containing catalyst is a solution of a platinum vinyl-siloxane complex and the amount added to the composition is from about 10 parts to 200 parts by weight of platinum based on 1 million parts of the organic polymer and the crosslinker is $(Me)_3SiO((Me)(H)SiO)_m((Me)_2SiO)_nSi(Me)_3$ where m is 5 and n is 3 and Me is methyl.

25. The method of claim 17 wherein the product comprises from 50 to 125 parts by weight of the fatty acid treated, precipitated calcium carbonate filler and from 25 to 100 parts by weight of a ground filler selected from the group consisting of calcium carbonate, kaolin clay and amorphous, non quartz silica each having a particle size in the range of 0.2 to 25 microns.

26. The method of claim 19 wherein the product comprises from 50 to 125 parts by weight of the fatty acid treated, precipitated calcium carbonate filler and from 25 to 100 parts by weight of a ground filler selected from the group consisting of calcium carbonate, kaolin clay and amorphous, non quartz silica each having a particle size in the range of 0.2 to 25 microns.

27. The method of claim 23 wherein the product comprises from 50 to 125 parts by weight of a fatty acid treated, precipitated calcium carbonate filler having a particle size in the range of 0.07 to 0.1 microns and from 25 to 100 parts by weight of a ground calcium carbonate filler having a particle size in the range of 0.2 to 25 microns, provided, that the ratio of fatty acid treated precipitated calcium carbonate to ground calcium carbonate filler is from 5:1 to 1:1.

28. The method of claim 24 wherein the product comprises from 75 to 125 parts by weight of a fatty acid treated, precipitated calcium carbonate filler having a particle size in the range of 0.07 to 0.1 microns and from 40 to 75 parts by weight of a fatty acid treated ground calcium carbonate filler having a particle size in the range of 0.2 to 15 microns, provided, that the ratio of fatty acid treated precipitated calcium carbonate to fatty acid treated ground calcium carbonate filler is from 3:1 to 1:1.

29. The method of claim 16, and further comprising mixing an inhibitor into the addition curable composition.

30. The product prepared by the method of claim 16.

31. An addition curable composition comprising -a product formed from components comprising:
   (A) 100 parts by weight of an organic polymer having on average at least 1.4 alkenyl groups per molecule;
   (B) an amount sufficient to cure the composition of a crosslinker having on average at least 1.4 hydrosilyl groups per molecule;
   (C) a platinum group metal-containing catalyst in an amount sufficient to effect curing of the composition;
   (D) 25 to 250 parts by weight of a fatty acid treated, precipitated calcium carbonate filler having an average particle size in the range of 0.05 to 1 micron; and
   (E) 25 to 125 parts by weight of a ground filler selected from the group consisting of calcium carbonate and amorphous, non quartz silica each having an average particle size in the range of 0.2 to 40 microns;
   provided, that the ratio of fatty acid treated precipitated calcium carbonate filler to ground filler is from 10:1 to 1:5.

* * * * *